(12) United States Patent
Machimura (10) Patent No.: US 7,516,290 B2
(45) Date of Patent: Apr. 7, 2009

(54) MEMORY CONTROLLER

(75) Inventor: Hiroki Machimura, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 369 days.

(21) Appl. No.: 11/528,406

(22) Filed: Sep. 28, 2006

(65) Prior Publication Data

US 2007/0073991 A1    Mar. 29, 2007

(30) Foreign Application Priority Data

Sep. 29, 2005    (JP) .............................. 2005-284505

(51) Int. Cl.
*G06F 13/00* (2006.01)

(52) U.S. Cl. ........................ 711/167; 711/105; 711/151; 711/154

(58) Field of Classification Search ................. 711/167, 711/105, 151, 154
See application file for complete search history.

(56) References Cited

U.S. PATENT DOCUMENTS

| 5,459,842 | A | * | 10/1995 | Begun et al. ................. 711/155 |
| 5,499,353 | A | * | 3/1996 | Kadlec et al. ................ 711/118 |
| 7,191,295 | B2 | * | 3/2007 | Qawami et al. ............. 711/150 |
| 2004/0148470 | A1 | * | 7/2004 | Schulz ........................ 711/137 |
| 2004/0268075 | A1 | * | 12/2004 | Qawami et al. ............. 711/167 |

FOREIGN PATENT DOCUMENTS

JP    6-161868    6/1994

OTHER PUBLICATIONS

"ARM7TDMI-S(Rev4) Technical Reference Manual" by Arm Limited., pp. 69-86, Internet <URL: http://www.arm.com/pdfs/DD10234A_7TDMIS_R4.pdf> 2001, pp. 69-86.

* cited by examiner

*Primary Examiner*—Stephen C Elmore
(74) *Attorney, Agent, or Firm*—McGinn IP Law Group, PLLC (57) ABSTRACT

Disclosed is a memory controller which is disposed between a CPU and a memory, receives from the CPU a control signal (TRANS) indicating whether a type of a bus cycle is a sequential cycle in which an address continuous with an address of an immediately preceding bus cycle is output to the memory as an address of a current bus cycle or a nonsequential cycle in which an address unrestricted by the address of the immediately preceding bus cycle is output to the memory as an address of a current bus cycle. The memory controller outputs a control signal (RDY) for notifying completion of the bus cycle to the CPU. In this memory controller, an address assuming the sequential cycle is generated in advance from the current address before completion of the bus cycle. Then, the address assuming the sequential cycle is supplied to the memory in a next cycle. Read data from the memory corresponding to the address assuming the sequential cycle is then output to the CPU. At this occasion, when data on an address corresponding to the nonsequential cycle should be originally supplied, the RDY signal is deactivated. As a result, the read data is not taken in by the CPU, and the read data is invalidated.

12 Claims, 6 Drawing Sheets

MEMORY CONTROLLER

FIELD OF THE INVENTION

The present invention relates to a memory controller. In particular, it relates to the memory controller connected to a bus of which a bus cycle from a CPU includes a sequential cycle and a nonsequential cycle.

BACKGROUND OF THE INVENTION

Figure 3:
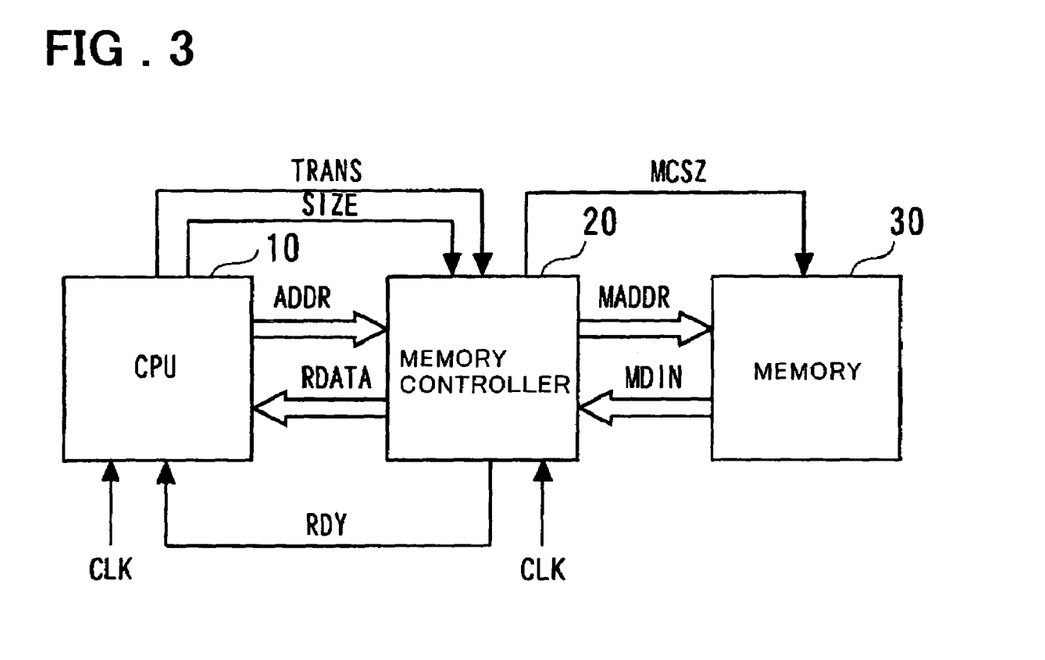
FIG. 3 is a diagram showing an overview of a connecting configuration among a memory controller, a CPU, and a memory in the embodiment of the present invention.

First, an example of a typical configuration of the memory controller will be described with reference to FIG. 3. FIG. 3 is referred to in a description of an embodiment of the present invention which will be given later as well. As shown in FIG. 3, a memory controller 20 is connected to a CPU 10 (processor) which is an upper layer device, via an address bus (ADDR), a data bus (RDATA), control signals such as a bus transfer control signal TRANS, a signal SIZE that defines a transfer unit size, and a ready signal RDY, and performs control over selection of a memory 30 through a chip select signal MCSZ, output of an address MADDR to the memory 30, reading of data MDIN from the memory 30, and writing of data to the CPU 10.

In FIG. 3, a write data bus (WDATA) between the CPU 10 and the memory controller 20, write data MDOUT from the memory controller 20 to the memory 30 are omitted. Control signals such as a write enable signal and an output enable signal from the memory controller 20 to the memory 30 are also omitted.

Figure 4:
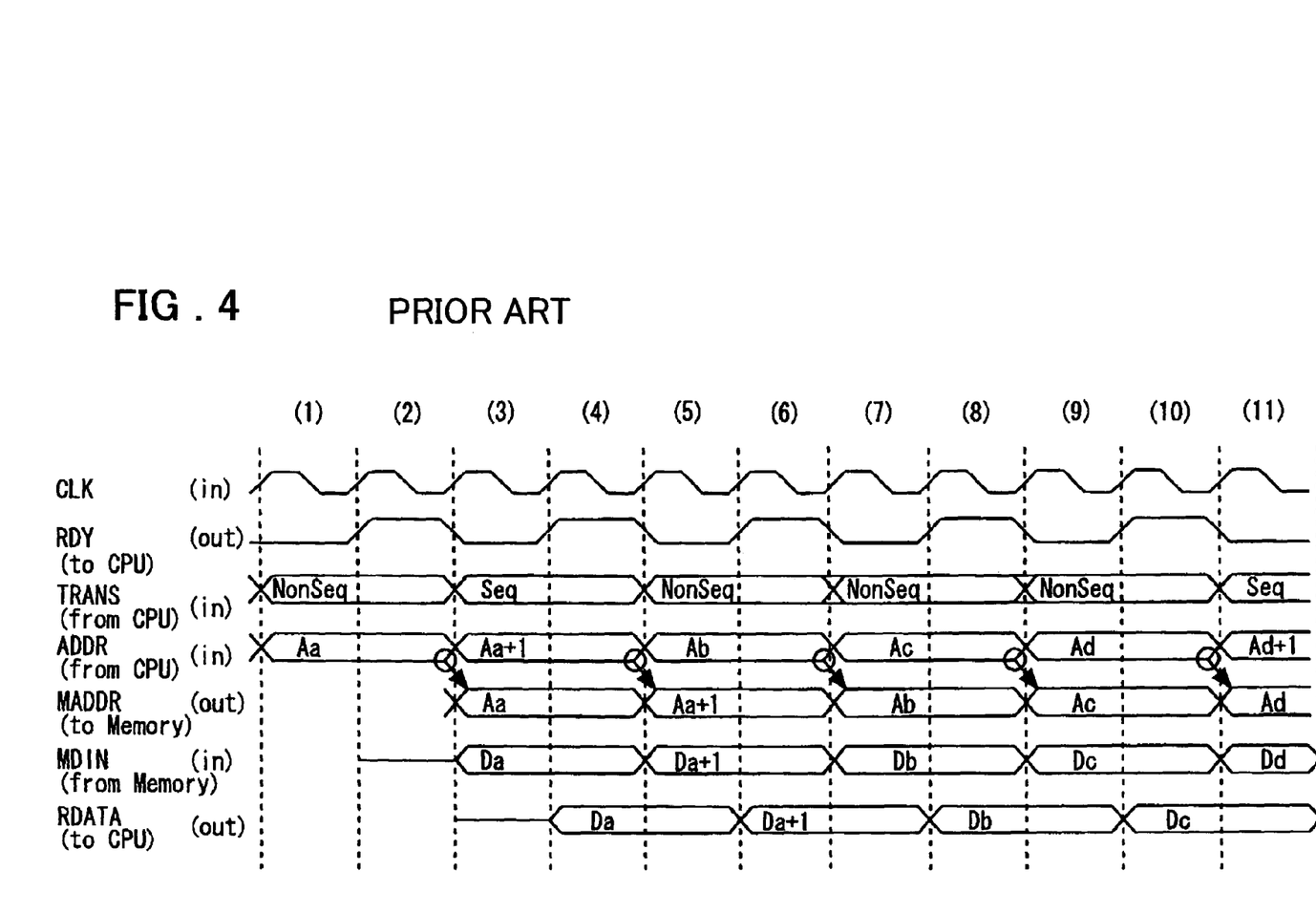
FIG. 4 is a timing diagram showing an example of an operation of a conventional device.

FIG. 4 is a timing waveform diagram for explaining an example of an operation of the memory controller in FIG. 3. The configuration shown in FIG. 3 and timing operations shown in FIG. 4 are prepared by an inventor of the present invention based on a description in Non-patent Document 1.

Referring to FIG. 4, CLK is a clock signal for driving the CPU 10 and the memory controller 20.

The RDY signal is a control signal output from the memory controller 20 to the CPU 10, and notifies completion of the bus cycle (memory access cycle) to the CPU 10. In the example in FIG. 4, the CPU 10 determines that the bus cycle is completed when the RDY signal is high (active) at a rising edge of the clock signal CLK. When the RDY signal is low (inactive) at the rising edge of the clock signal CLK, the bus cycle is extended on a clock cycle basis. Incidentally, referring to FIG. 4, the bus cycle is completed in two clock cycles, and the bus cycle extended on a clock cycle basis is not shown in each of clock cycles (1) to (11). The RDY signal in FIGS. 3 and 4 corresponds to a clock enable signal CLKEN in Non-patent Document 1. In Non-patent Document 1, a value of the signal CLKEN is sampled at a rising edge of the clock signal CLK in the CPU (core). For each clock cycle, control is performed so that when the signal CLKEN is high, the bus cycle is completed, and when the signal CLKEN is low, the bus cycle is extended.

The bus transfer control signal TRANS (also referred to as a "bus transfer state signal" or a "memory request signal") is a control signal (of two bits) output from the CPU 10 to the memory controller 20, and notifies to the memory controller 20 following types of a bus access:

a nonsequential cycle (Nonseq; also referred to as a "non-sequential access")

a sequential cycle (Seq; also referred to as a "sequential access")

an internal cycle (Internal).

Though no particular limitation is imposed, the signal TRANS is output in synchronization with a predetermined rise of the clock signal CLK at a beginning of the bus cycle.

The nonsequential cycle (NonSeq) instructs that an address that is not restricted by or unrelated to an address of an immediately preceding cycle be output as an address of a current cycle.

The sequential cycle (Seq) instructs that an address in a current cycle be the address obtained by incrementing an address in an immediately preceding cycle by a half word or a full word. The sequential cycle (Seq) is used for a burst access to a DRAM memory, for example.

The internal cycle instructs that the CPU 10 perform an internal operation and does not perform bus transfer. Referring to FIG. 4, for simplification, the CPU 10 is described to output to the memory controller 20 an address obtained by incrementing the address of an immediately preceding cycle in the sequential cycle (Seq) by one. That is, an increment unit for sequential access addresses is set to one, for the simplification.

ADDR is an address signal on an address bus which is supplied to the memory controller 20 from the CPU 10.

MADDR is an address bus signal which is supplied to the memory 30 from the memory controller 20.

MDIN is data (read data) which is output to the memory controller 20 from the memory 30.

RDATA is read data which is output onto a read data bus for the CPU 10 from the memory controller 20. In FIG. 4, MCSZ and SIZE in FIG. 3 are omitted.

As seen from FIG. 4 as well, two clock cycles are required for a bus cycle for a read access, and a wait corresponding to one clock cycle is always inserted. In a next bus cycle after one bus cycle is completed, the access from the memory controller 20 to the memory 30 is made using an address associated with the one bus cycle. More specifically, after an address is output from the CPU 10 in a certain bus cycle (refer to a clock cycle (1), (3), (5), or the like), the address MADDR from the memory controller 20 to the memory 30 is output after two clock cycles (refer to a clock cycle (3), (5), (7), or the like). Then, the data MDIN read from the memory, corresponding to the address in the immediately preceding bus cycle is output to the read data bus RDATA (refer to a clock cycle (2), (4), (6), (8), or the like).

In each bus cycle, the memory controller 20 makes the RDY signal active (HIGH level) two clocks after the read data is output to the read bus RDATA (refer to the clock cycle (2), (4), (6), (8), or the like), thereby inserting a wait cycle corresponding to one clock.

A description will be added to the timing operations shown in FIG. 4. In the clock cycle (1), a type of the bus cycle is set to the nonsequential cycle (NonSeq), and in this bus cycle, an address Aa is supplied to the memory controller 20 from the CPU 10. The address Aa is supplied to the memory 30 from the memory controller 20 in the clock cycle (3) as the address output MADDR corresponding to this address. Then, data Da is supplied to the memory controller 20 as the data MDIN from the memory 30. The memory controller 20 sets the RDY signal active (HIGH level) in synchronization with the rising edge of the clock signal CLK in the clock cycle (2). The CPU 10 receives this RDY signal (In the example shown in FIG. 4, the CPU 10 samples the RDY signal responsive to the fall of the clock signal CLK in the clock cycle (2)), and outputs the control signal TRANS and the address signal ADDR in synchronization with the falling edge of the clock in the clock cycle (3).

In the clock cycle (3), the type of the bus cycle is set to be the sequential cycle (Seq), and the CPU 10 generates an address Aa+1 obtained by incrementing the address Aa in the immediately preceding bus cycle and the so generated address to the memory controller 20. In the clock cycle (5), the address Aa+1 is supplied to the memory 30 as the memory address output MADDR from the memory controller 20, and then read data Da+1 corresponding to the address Aa+1 is supplied to the memory controller 20 as the data MDIN from the memory 30.

In the clock cycle (5), the type of the bus cycle is set to the nonsequential cycle (NonSeq). An address Ab from the CPU 10 is supplied to the memory controller 20. In the clock cycle (7), the address Ab is supplied to the memory 30 as the memory address output MADDR from the memory controller 20 corresponding to the address Ab, and read data Db corresponding to the address Ab is supplied from the memory 30 to the memory controller 20 as the data MDIN. The types of the bus cycles are set to the nonsequential cycles (NonSeq) in the following clock cycles (9) and (11) as well.

Figure 5:
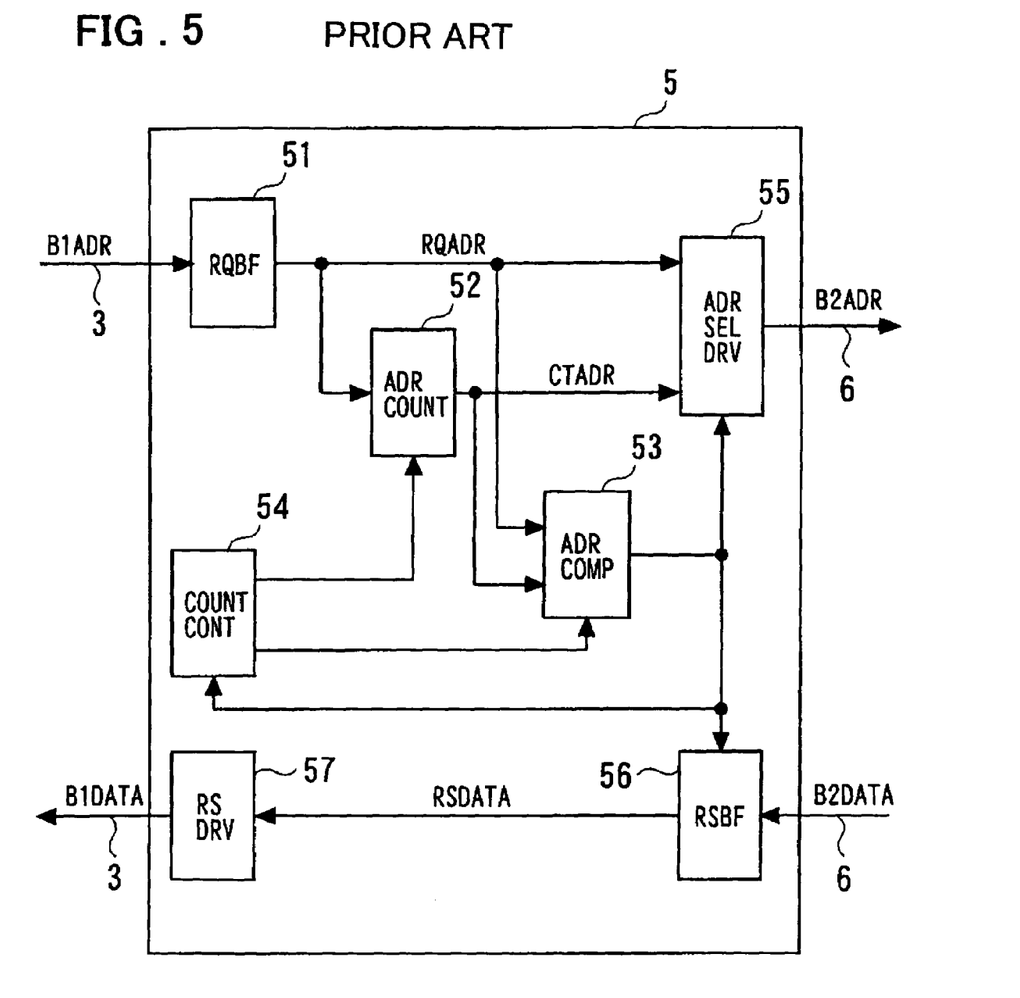
FIG. 5 is a diagram showing a configuration in Patent Document 1.
Figure 6:
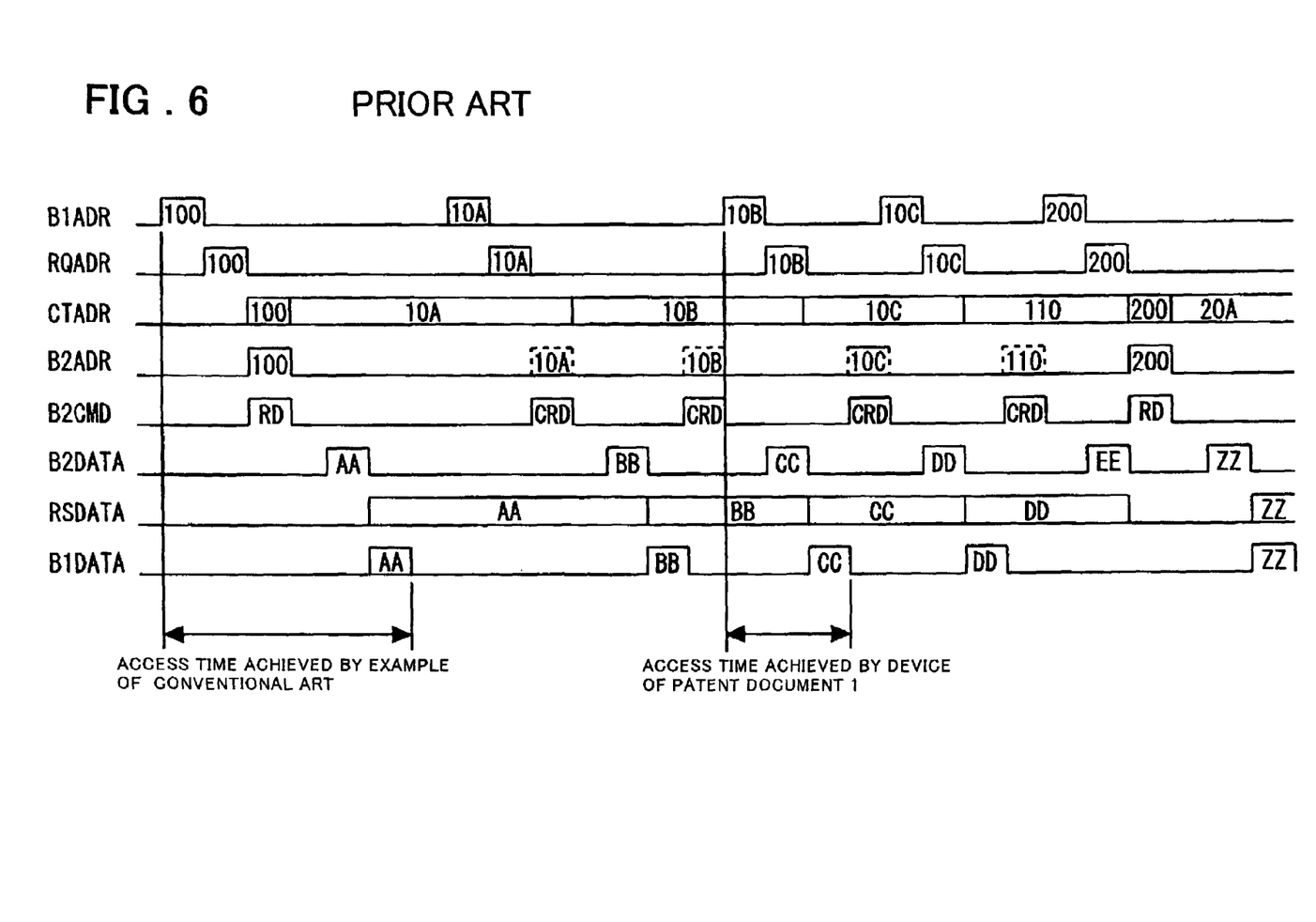
FIG. 6 is a timing diagram showing an example of an operation of the device in FIG. 4.

Patent Document 1 proposes a configuration as shown in FIG. 5 as a memory controller (also termed as memory control device) for reducing an idle address state and implementing effective data transfer. Referring to FIG. 5, this memory controller includes an address counter 52 for generating a look-ahead address, an address comparator 53 for comparing an address CTADR counted up by the address counter 52 with a request address RQADR, a counter memory controller 54 for controlling the address counter 52 and the address comparator 53, and an address select driver 55 for making a selection between a count address and a request address and outputting an address B2ADR for a memory to a bus 6. Until a processor issues a next request, data at a next sequential memory address is prior read, thereby reducing the unnecessary address state and effecting improvement in performance of accessing the memory. Referring to FIG. 5, reference numeral 51 denotes a request buffer for buffering a request B1ADR from a bus 3, reference numeral 56 denotes a response buffer for receiving response data B2DATA from the bus 6, and reference numeral 57 denotes a response driver for inputting response data RSDATA and outputting response data B1DATA to the bus 3. FIG. 6 shows a timing chart described in Patent Document 1.

As shown in FIG. 6, after the memory controller in FIG. 5 has detected a continuous mode command (CRD) as a command B2CMD from a processor, the memory controller switches the address output B2ADR for the memory to an output of the address counter 52, for output.

Further, when data B2DATA output from the memory is taken in by the memory controller, erroneous data EE prior read is not latched by the response buffer (RSBF) 56, thereby invalidating the erroneous data EE.

When transition from sequential access (CRD) to nonsequential access (RD) such as transition of the address B1ADR on the bus 3 from 10 C to 200 is made, it takes several clocks to output last "DD" in the sequential access (CRD) from the data B1DATA through the bus 3 and output a next address to the memory from the address B2ADR through the bus 6.

[Patent Document 1] JP Patent Kokai Publication No. JP-A-6-161868

[Non-patent Document 1] "ARM7TDMI-S(Rev4) Technical Reference Manual" by ARM Limited., pp. 69-86, Internet <ULR: http://www.arm.com/pdfs/DDI0234A_7TDMIS_R4.pdf>

SUMMARY OF THE DISCLOSURE

As described above, in the case of the memory controller described with reference to FIG. 4, when a bus cycle is completed, memory access is started. Accordingly, a wait cycle corresponding to one clock cycle is inserted, thereby making it difficult to perform a high-speed operation.

In the memory control device described in Patent Document 1, after the memory control device has detected a continuous mode, an address output to the memory is switched to an output of the address counter, for output. In the case of the configuration as described above, it is difficult to implement a higher-speed operation.

In order to solve the problem described above, the invention disclosed in this application is generally configured as follows.

A memory controller according to one aspect of the present invention performs address and data transfer between a CPU and a memory, and receives from said CPU a first control signal including at least information indicating whether a type of a bus cycle is a sequential cycle with an address thereof being continuous with an address of an immediately preceding bus cycle or a nonsequential cycle with address thereof being unrestricted by the address of the immediately preceding cycle. The memory controller includes a first circuit for generating the address having a value continuous with the current address before the current bus cycle is completed, assuming that the bus cycle immediately following the current bus cycle is the sequential cycle.

In the present invention, the first circuit includes a circuit for performing control so that based on the first control signal, the address having the continuous value or the address output from the CPU to the memory controller is output to the memory in a clock cycle immediately following a clock cycle in which the address having the continuous value has been generated.

In the present invention, a second circuit for generating a second control signal for notifying bus cycle completion to the CPU is included. Based on the first control signal, the second circuit activates or deactivates the second control signal to be output to the CPU in a certain clock cycle immediately following a clock cycle in which the immediately preceding bus cycle has been completed. More specifically, the second circuit controls the activation and the deactivation of the second control signal in the certain clock cycle immediately following the clock cycle in which the immediately preceding bus cycle has been completed, based on the first control signal, thereby controlling whether to take in read data from the memory by the CPU or not, the read data being transferred from the memory controller to the CPU.

In the present invention, it may be so configured that the second circuit deactivates the second control signal and extends the bus cycle by a further one clock cycle when the address output from the memory controller to the memory is the address of the nonsequential cycle supplied from the CPU to the memory controller in the clock cycle in which read data from the memory corresponding to the address with the continuous value is supplied to the CPU.

In the present invention, the first circuit may include:

a circuit for selecting an output of a circuit for generating the address having the value continuous with the address output to the memory in the current clock cycle when the second control signal is inactive in the clock cycle immediately preceding the current clock cycle or when the first control signal indicates the sequential cycle in the current clock cycle, and selecting the address provided by the CPU, otherwise.

In the present invention, the first circuit includes:

an adder for generating the address obtained by incrementing the input address by a predetermined value;

a selector for inputting an output of the adder and the address from the CPU and selecting one of the output of the adder and the address from the CPU, for output; and a register for sampling an output of the selector. An output of the register is input to the adder.

In the present invention, the second circuit may include:

a first latch circuit for latching the second control signal being currently output from the second circuit;

a first logic circuit for outputting a result of a predetermined logical operation between a signal constituting the first control signal and being activated at a time of the sequential cycle and an output signal of the first latch circuit;

a second latch circuit for sampling an output signal of the first logic circuit;

a second logic circuit for outputting a result of a predetermined logical operation among an output signal of the second latch circuit, the second control signal being currently output from the second circuit, and a signal constituting the first control signal and being activated at a time of the nonsequential cycle; and a third latch circuit for latching an output signal of the second logic circuit.

In the present invention, the first logic circuit is constituted from a logical OR circuit for inputting the signal being activated at the time of the sequential cycle and an inverted signal of the output of the first latch circuit; and the second logic circuit is constituted from a NAND circuit for inputting the output signal of the second latch circuit, the second control signal, and the signal being activated at the time of the nonsequential cycle.

In the present invention, the output of the first logic circuit is set to a selection control signal for the selector.

A memory controller according to the present invention is the memory controller that performs address and data transfer between a CPU and a memory and receives from the CPU a first control signal including at least information indicating whether a type of a bus cycle is a sequential cycle with an address thereof continuous with an address of an immediately preceding bus cycle or a nonsequential cycle with an address thereof unrestricted by the address of the immediately preceding cycle and outputs a second control signal for notifying completion of the bus cycle. The memory controller includes:

a circuit for generating in advance the address assuming the sequential cycle from the address of the bus cycle at a current time before the current bus cycle is completed and outputting to the memory the address assuming the sequential cycle in a clock cycle immediately following a clock cycle in which the address assuming the sequential cycle has been generated; and a circuit for outputting to the CPU read data from the memory, corresponding to the address assuming the sequential cycle and deactivating the second control signal when read data at the address corresponding to the nonsequential cycle should be supplied at a time of the output of the read data corresponding to the address assuming the sequential cycle, thereby invalidating the read data output to the CPU.

The meritorious effects of the present invention are summarized as follows.

According to the present invention, an address assuming the sequential cycle is generated in advance before completion of a bus cycle, and is output to the memory in the next cycle. Then, read data at the address assuming the sequential cycle is supplied to a CPU. When data at an address corresponding to a nonsequential cycle should be supplied at this occasion, the control signal for notifying completion of the bus cycle to the CPU is deactivated, thereby allowing implementation of an increase in efficiency and speeding up of a memory access without making any change in specifications for the memory access from the CPU.

Still other features and advantages of the present invention will become readily apparent to those skilled in this art from the following detailed description in conjunction with the accompanying drawings wherein only the preferred embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED EMBODIMENTS OF THE INVENTION

Preferred embodiments of the invention of the present invention described above in further detail, a description will be given below with reference to appended drawings. A memory controller of the present invention in a best mode thereof is disposed between a CPU (indicated by reference numeral 10 in FIG. 3) and a memory (indicated by reference numeral 30 in FIG. 3), and receives from the CPU a control signal (TRANS) indicating whether a type of a bus cycle is a sequential cycle in which an address thereof is continuous with an address of an immediately preceding cycle or a nonsequential cycle in which the address thereof is not associated with the address of the immediately preceding cycle, and outputs a control signal (RDY) for notifying completion of the bus cycle to the CPU. The address assuming the sequential cycle is generated in advance based on the current address before completion of the bus cycle, and is supplied to the memory in the next cycle. Then, read data from the memory corresponding to the address assuming the sequential cycle is output from the memory controller to the CPU. At this occasion, when data at the address associated with the nonsequential cycle should be originally supplied (when the address to be output to the memory is the address of the nonsequential cycle), the control signal (RDY) is deactivated. The CPU therefore does not take in the read data, and accordingly performs control to invalidate the read data. A description will be given below, based on an embodiment.

In the present embodiment, the memory controller is connected with the CPU and the memory in the same manner as that shown in FIG. 3. In the memory controller of the present embodiment, control over an address MADDR to be output to the memory and control over the RDY signal indicating completion of a bus cycle are different from conventional ones. In order to clarify a difference between timing operations in the present embodiment and conventional timing operations shown in FIG. 4, a description will be given below with reference to FIG. 3 and FIG. 1, which is a timing diagram explaining an operation of the present embodiment.

Figure 1:
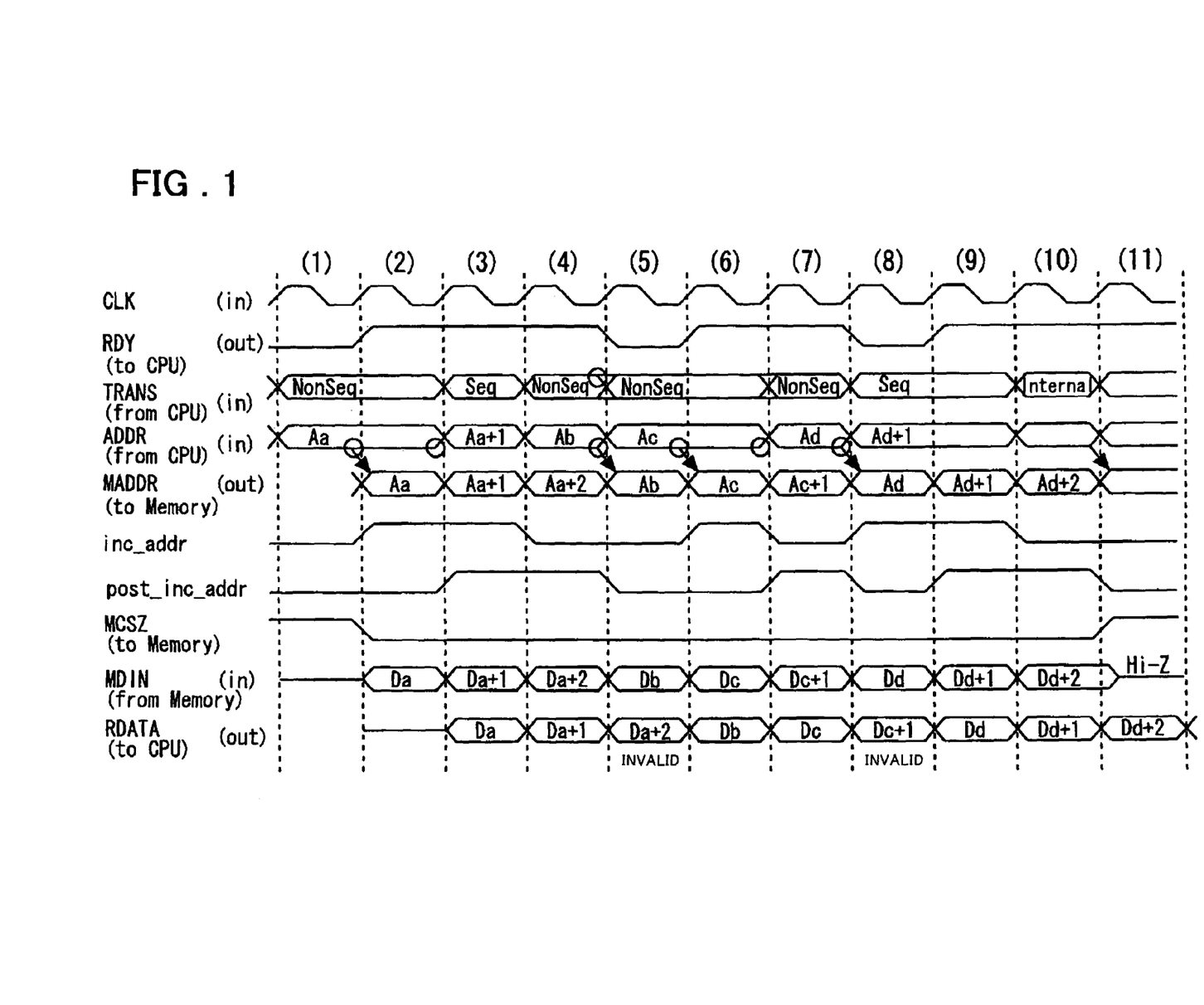
FIG. 1 is a timing diagram showing an example of an operation of an embodiment of the present invention.

In the present embodiment, before an immediately preceding bus cycle is completed, either of an address from the CPU 10 and a value obtained by incrementing an immediately preceding address is selected as an address output MADDR for the memory 30 in accordance with the bus transfer control signal (TRANS) from the CPU 10. In the next clock cycle after the immediately preceding bus has been completed, activation and deactivation of the RDY signal that notifies completion of a bus cycle to the CPU 10 is controlled according to the bus transfer control signal TRANS. Whether to take in read data from the memory 30 by the CPU 10 or not is thereby controlled (the read data is not sampled by the CPU 10 when the RDY signal is inactive). In FIG. 1, reference character MCSZ denotes a chip select signal (active LOW) to be supplied from the memory controller 20 to the memory 30.

In the present embodiment, as types of a bus transfer with the CPU 10 (bus cycle), there are provided a nonsequential cycle (NonSeq), a sequential cycle (Seq), and a non-bus-transfer (internal) cycle in which the bus transfer is not performed.

Referring to FIG. 1, the cycle immediately before a clock cycle (1) is set to be the nonsequential (NonSeq) cycle. At a rising edge of a clock CLK in a clock cycle (2), the RDY signal is HIGH (with one bus cycle being constituted from the clock cycles (1) and (2) in this case). In the present embodiment, before the bus cycle is finished, or at the rising edge of the clock signal CLK in the clock cycle (2), which is one clock before the end of the bus cycle, an address Aa is supplied to the memory 30 as the memory address MADDR. For this reason, in the present embodiment, a time corresponding to one clock cycle in the bus cycle is reduced compared with a conventional memory controller shown in FIG. 4 (in which the MADDR is supplied to the memory after completion of the bus cycle).

Though no particular limitation is imposed, the memory 30 in the present embodiment is assumed to be accessible with no wait. For this reason, data Da read at the address Aa of the memory 30 is output to the CPU 10 as data RDATA at the rising edge of the clock in a clock cycle (3). Since the RDY signal is HIGH in the clock cycle (3), the CPU 10 samples the data Da at the rising edge of the clock cycle (3).

Figure 2:
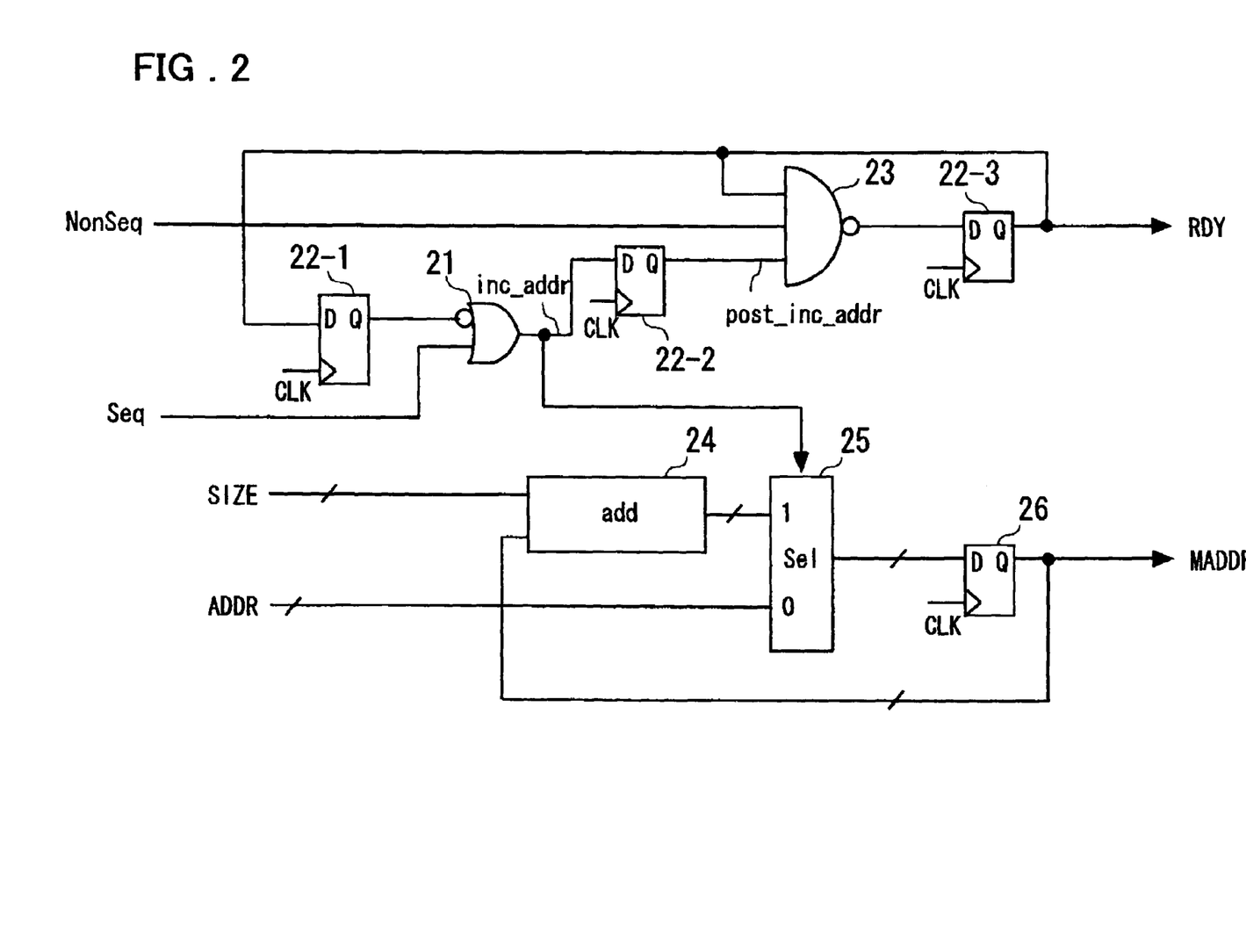
FIG. 2 is a diagram showing a configuration of the embodiment of the present invention.

FIG. 2 is a diagram showing an example of the configuration of essential parts of the memory controller in the present embodiment. FIG. 2 shows configuration of a circuit for generating the RDY signal for the CPU 10 (refer to FIG. 3) and a circuit for generating the address output MADDR for the memory 30 (refer to FIG. 3). These circuit configurations constitute part of a main feature of the present invention.

Referring to FIG. 2, the memory controller in the present embodiment comprises a RDY signal generating circuit which includes a D-type flip-flop (latch circuit) 22-1, a 2-input OR circuit 21, a D-type flip-flop (latch circuit) 22-2, a 3-input NAND circuit 23, a D-type flip-flop (latch circuit) 22-3, and a memory address output MADDR generating circuit which includes an adder 24, a selector 25 and a D-type register (latch circuit) 26.

The D-type flip-flop 22-1 receives at a data input terminal D thereof the RDY signal being currently output to sample the RDY signal responsive to an edge of the clock signal CLK. The 2-input OR circuit 21 receives an inverted signal of an output of the D-type flip-flop 22-1 and a signal Seq of a bus transfer control signal TRANS from the CPU 10 (refer to FIG. 3), which indicates that a bus cycle is a sequential cycle (sequential access). The D-type flip-flop 22-2 receives at a data input terminal D thereof an output signal (inc_addr) of the OR circuit 21 to sample the output signal (inc_addr) responsive to the edge of the clock signal CLK. The 3-input NAND circuit 23 receives an output signal (post_inc_addr) from an output terminal Q of the D-type flip-flop 22-2, a signal NonSeq of the bus transfer control signal TRNS from the CPU 10 (refer to FIG. 3), which indicates that a bus cycle is the nonsequential cycle (nonsequential access), and the RDY signal being currently output. The D-type flip-flop 22-3 receives at a data input terminal D thereof an output of the NAND circuit 23 and samples the output of the NAND circuit 23 responsive to the edge of the clock signal CLK to output the RDY signal at an output terminal Q thereof. The RDY signal output from an output terminal Q of the D-type flip-flop 22-3 is supplied to the CPU 10. Incidentally, referring to FIG. 2, the signals Seq and Nonseq are the signals obtained by decoding at a decoder not shown that receives the signal TRANS from the CPU 10 (refer to FIG. 3).

The adder 24 adds a size (SIZE) to the address output MADDR (such as 32 bits) for the memory 30. The selector 25 receives an output of the adder 24 and an address ADDR from the CPU 10 and selects one of the output of the adder 24 and the address ADDR from the CPU 10 with the output inc_addr of the OR circuit 21 used as a selection control signal. The D-type register (latch circuit) 26 receives an address output signal from the selector 25 at a plurality of data terminals thereof in parallel, and samples the address output signal responsive to the edge of the clock signal CLK to output the so sampled address signal as the address output MADDR.

When the RDY signal is LOW, the output of the NAND circuit 23 goes HIGH, and the RDY signal output from the output terminal Q of the D-type flip-flop 22-3 goes HIGH at the rising edge of the clock signal CLK in the next clock cycle.

When the RDY signal is HIGH, the signal NonSeq is HIGH, and the signal post_inc_addr is HIGH in a certain clock cycle (the signal post_inc_addr going HIGH in the certain clock cycle when the signal Seq is HIGH in the clock cycle one clock cycle before the certain clock cycle or when the RDY signal is LOW in the clock cycle two clock cycles before the certain clock cycle), the output of the NAND circuit becomes LOW. Then, the RDY signal output from the output terminal Q of the D-type flip-flop 22-2 goes LOW at the rising edge of the clock signal CLK in the next clock cycle.

When the Seq signal is LOW in a certain clock cycle (and the NonSeq signal is HIGH) and when the RDY signal in the clock cycle one clock cycle before the certain clock cycle is HIGH, the output inc_addr of the OR circuit 21 goes LOW. Then, the output post_inc_addr of the D-type flip-flop 22-2 that samples the output inc_addr at the rising edge of the clock signal in the next clock cycle goes LOW. The output of the NAND circuit 23 thereby goes HIGH, and the RDY signal that is the output of the D-type flip-flop 22-3 goes HIGH. When the Seq signal is HIGH in a certain clock cycle or the RDY signal is LOW in the clock cycle immediately preceding the certain clock cycle, the output inc_addr of the OR circuit 21 goes HIGH.

The selector 25 selects the address ADDR from the CPU 10 when the output inc_addr is LOW (with a logic value thereof being 0). The selector 25 selects a result of addition by the adder 24 when the output inc_addr is HIGH (with the logic value thereof being 1).

A series of operations of the memory controller described with reference to FIG. 2 will be further explained with reference to FIG. 1.

In the clock cycle (1) in FIG. 1, the output of the D-type flip-flop 22-1 is HIGH, the bus transfer control signal TRANS indicates the nonsequential cycle (with the signal NonSeq being HIGH), the signal Seq is LOW, the output (inc_addr) of the OR circuit 21 is LOW, and the selector 25 selects the address ADDR (Aa) from the CPU 10 (refer to FIG. 3). The D-type register 26 samples the output Aa from the selector 25 at the rising edge of the clock signal CLK in the next clock cycle (2) to output the sampled address as the address output MADDR for the memory 30 (refer to FIG. 3).

In the clock cycle (2), the read data Da read from the memory 30 at the address Aa is output as data MDIN. The output of the NAND circuit 23 that receives the signal RDY at a LOW level in the clock cycle (1) is HIGH, and the RDY signal, which is the output of the D-type flip-flop 22-3, goes HIGH at the rising edge of the clock signal CLK in the clock cycle (2). Further, the output of the D-type flip-flop 22-1 goes LOW at the rising edge of the clock in the clock cycle (2), and the output (inc_addr) of the OR circuit 21 thereby goes HIGH. When the output inc_addr goes HIGH (with the logic value thereof being 1), the selector 25 selects an output of the adder 24.

The signal SIZE is the signal that is supplied from the CPU 10 and specifies an increment unit at the adder 24 of the memory controller 20. The increment unit at the adder 24 is adjustably set to 2, 4, or the like according to specification of a half word or a full word. In the present embodiment, the signal SIZE is fixed at 1, for simplicity.

Accordingly, in the clock cycle (2), the adder 24 outputs a result of addition Aa+1 obtained by adding the address output MADDR (=Aa) for the memory and 1. The selector 25 selects the output Aa+1 of the adder 24. The D-type register 26 outputs the result Aa+1 as the output MADDR at the rising edge of the clock CLK in the next clock cycle (3).

In the clock cycle (3), the transfer control signal TRANS indicates the sequential cycle Seq (with the signal Seq being HIGH), and the output inc_addr of the OR circuit 21 is thereby driven HIGH. Then, the address Aa+1 obtained by the incrementation by the adder 24 in the immediately preceding clock cycle (2) is output from the D-type register 26 as the address output MADDR for the memory 30. In the clock cycle (3), read data Da+1 read at the address Aa+1 is output as the data MDIN, and the data Da+1 is supplied to the CPU 10 through the read data bus RDATA in a next clock cycle (4). Since the output post_inc_addr is LOW in the clock cycle (2), the output of the NAND circuit 23 is HIGH, and the RDY signal is HIGH in the clock cycle (3). In the clock cycle (3), the output inc_addr is HIGH, so that the selector 25 selects an output of the adder 24. The adder 24 outputs a result of addition Aa+2 of the address output MADDRR (=Aa+1) for the memory 30 and the signal SIZE (=1). Then, at the rising edge of the clock CLK of the next clock cycle (4), the D-type register 26 outputs the result Aa+2 as the output MADDR.

In the clock cycle (4), the transfer control signal TRANS indicates the nonsequential cycle NonSeq (with the signal NonSeq being HIGH), and an address Ab from the CPU 10 is output as the address output MADDR for the memory 30 at the rising edge of the clock signal CLK in a clock cycle (5).

In the clock cycle (4), the signal Seq is LOW. Then, since the RDY signal in the clock cycle (3) is HIGH, the output of the D-type flip-flop 22-1 goes HIGH. The output inc_addr of the OR circuit 21 therefore goes LOW. Since the output inc_addr is LOW, the selector 25 selects the address ADDR (=Ab) from the CPU 10. The D-type register 26 outputs the address Ab as the output MADDR at the risig edge of the clock in the next clock cycle (5).

Since the signal NonSeq, the RDY signal, and the output post_inc_addr are all HIGH in the clock cycle (4), the output of the NAND circuit 23 goes LOW, and the RDY signal goes LOW in synchronization with the rising edge of the clock signal CLK in the clock cycle (5).

In the memory controller 20 in the clock cycle (4), the sequential address Aa+2 obtained by incrementing the address Aa+1 is output as the output MADDR, and read data Da+2 read from the memory at the sequential address Aa+2 is output as the data MDIN.

The data Da+2 is supplied from the memory controller 20 to the CPU 10 through the read data bus RDATA in synchronization with the rising edge of the clock cycle (5). However, as described above, the RDY signal is set to be inactive (LOW) in the clock cycle (5). For this reason (since the bus cycle is not completed), the CPU 10 does not take in the data Da+2 on the read data bus RDATA. With this arrangement, the read data corresponding to the sequential address Aa +2 prepared in advance at the memory controller 20 is substantially invalidated.

In the clock cycle (5), the address Ab output from the CPU 10 to the memory controller 20 in the immediately preceding clock cycle (4) is supplied to the memory 30 as the address output MADDR, and data Db read from the memory, corresponding to the address Ab is supplied to the memory controller (with the data Da+2 output to the data bus RDATA). In the clock cycle (5), the RDY signal is made inactive, and the bus cycle is extended by one clock cycle.

In a clock cycle (6), the transfer control signal TRANS indicates the nonsequential cycle NonSeq (with the signal NonSeq being HIGH), and the address remains at the address ADDR.

Incidentally, since the RDY signal is LOW in the clock cycle (5), the output of the NAND circuit 23 is HIGH, and the RDY signal, which is the output of the D-type flip-flop 22-3, goes HIGH at the rising edge of the clock signal in the clock cycle (6).

Further, in the clock cycle (6), an address Ac received from the CPU 10 in the clock cycle (5) is output as the address output MADDR for the memory 30, and read data Dc read from the memory 30 at the address Ac is output as the data MDIN. Further, the data Db supplied to the memory controller 20 from the memory 30 in the immediately preceding clock cycle (5) is output to the CPU 10 through the data bus RDATA. Since the RDY signal is HIGH at this point, the data Db on the RDATA is taken in by the CPU 10.

In a next clock cycle (7), the transfer control signal TRANS indicates the nonsequential cycle NonSeq (with the signal NonSeq being HIGH), and an address Ad is supplied to the memory controller 20 from the CPU 10. The address Ad is output as the address output MADDR for the memory 30 at the rising edge of the clock in a next clock cycle (8).

In the clock cycle (7), an address Ac +1 obtained by incrementing the address Ac in the immediately preceding clock cycle (6) by one is output as the address output MADDR for the memory 30, and read data Dc +1 read from the memory 30 at the address Ac +1 is output as the data MDIN. In the clock cycle (7), the data Dc supplied from the memory 30 to the memory controller 20 in the immediately preceding cycle (6) is output to the CPU 10 through the read data bus RDATA. In the clock cycle (6), the RDY signal is HIGH, the signal NonSeq is HIGH, and the output post_inc_addr is LOW. Accordingly, the output of the NAND circuit 23 is HIGH, and even in the clock cycle (7), the RDY signal is kept to be HIGH. For this reason, the data Dc is taken in by the CPU 10. The RDY signal is HIGH in the clock cycle (6) and the signal Seq is LOW in the clock cycle (7). Thus, the output inc_addr is driven LOW in the clock cycle (7).

In a clock cycle (8), the transfer control signal TRANS indicates the sequential cycle Seq (with the signal Seq being HIGH), and an address Ad+1 obtained by incrementing the address Ad in the immediately preceding cycle is supplied to the memory controller 20 from the CPU 10. In the clock cycle (8), the address Ad supplied from the CPU 10 in the immediately preceding clock cycle (7) is output as the address output MADDR. In this clock cycle (8), the output inc_addr is HIGH. Thus, the selector 25 of the memory controller 20 selects an output (=Ad+1) of the adder 24. In the clock cycle (7), the RDY signal is HIGH, the signal NonSeq is HIGH, and the output post_inc_addr is HIGH. Thus, the output of the NAND circuit 23 goes LOW, and the RDY signal, which is the output of the D-type flip-flop 22-3, goes LOW at the rising edge of the clock signal CLK in the clock cycle (8).

Further, in the clock cycle (8), the data Dc+1 read from the memory 30 at the address Ac+1 is supplied to the CPU 10 from the memory controller 20 through the read data bus RDATA. Incidentally, the RDY signal is LOW in the clock cycle (8). Thus, the data Dc+1 on the read data bus RDATA is not taken in by the CPU 10, and is invalidated. In the clock cycle (8), the bus cycle is not completed and extended by one clock cycle.

A clock cycle (9) is an extension of the bus cycle of the clock cycle (8). The transfer control signal TRANS indicates the same sequential cycle Seq as that in the clock cycle (8). The address ADDR is kept at the address Ad+1, as in the clock cycle (8). In the memory controller 20, since the output inc_addr is HIGH, the selector 25 selects an output of the adder 24 (=Ad+2). In a next clock cycle (10), the output Ad+2 is output as the address output MADDR for the memory 30. Further, in the clock cycle (8), the RDY signal is LOW. Accordingly, the output of the NAND circuit 23 goes HIGH. The RDY signal, which is the output of the D-type flip-flop 22-3, goes HIGH at the rising edge of the clock signal CLK in the clock cycle (9).

In the clock cycle (9), data Dd+1 read from the memory 30 at the address Ad+1 is supplied from the memory controller 20 to the CPU 10 through the read data bus RDATA. In the clock cycle (9), the RDY signal is HIGH. Accordingly, the data Dd+1 on the read data bus RDATA is taken in by the CPU 10.

In the clock cycle (10), the transfer control signal TRANS indicates the internal cycle, so that no access to the bus is made.

In a clock cycle (11), a chip select signal MCSZ is made inactive. The memory 30 is not selected, so that the data MDIN is brought into HI-Z (a high-impedance state), for example.

According to the present embodiment, the bus cycle where invalidation of data is not carried out is set to one clock cycle, which is a minimum unit, and through control over deactivation of the RDY signal, data is invalidated. Higher-speed memory access is thereby able to be realized without making any change in specifications for the CPU.

The embodiment described above was described based on a configuration based on specifications of Non-patent Document 1. The present invention is not limited to the configuration of the embodiment described above, and of course includes various variations and modifications that could be made by those skilled in the art within the range of the present invention.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed:

1. A memory controller performing address and data transfer between a CPU and a memory, said memory controller comprising a circuit that receives from said CPU a first control signal including at least information indicating whether a type of a bus cycle is a sequential cycle or a nonsequential cycle and performing control of a bus cycle such that when said first control signal indicates the sequential cycle, an address continuous with an address of an immediately preceding bus cycle is output to said memory as an address of a current bus cycle, while when said first control signal indicates the nonsequential cycle, an address unrestricted by an address of an immediately preceding cycle is output to said memory as an address of a current bus cycle, said memory controller further comprising a first circuit that on the premise that a bus cycle immediately following a current bus cycle is the sequential cycle, generates an address having a value continuous with a current address, before the current bus cycle is completed.

2. The memory controller according to claim 1, wherein said current address is one of the address output from said CPU in the current bus cycle and the address being output to said memory by said memory controller in the current bus cycle.

3. The memory controller according to claim 1, wherein said first circuit includes a circuit that performs control so that, based on the first control signal, the address having the continuous value or the address being output from said CPU to said memory controller is output to said memory in a clock cycle immediately following a clock cycle in which the address having the continuous value has been generated.

4. The memory controller according to claim 1, further comprising a second circuit that generates a second control signal for notifying bus cycle completion to said CPU; said second circuit activating or deactivating the second control signal to be output to said CPU, based on the first control signal, in a clock cycle immediately following a clock cycle in which the immediately preceding bus cycle has been completed.

5. The memory controller according to claim 4, wherein said second circuit controls the activation and the deactivation of the second control signal, based on the first control signal, in a clock cycle immediately following the clock cycle in which the immediately preceding bus cycle has been completed, to control whether to take in read data from said memory by said CPU or not, the read data being transferred from said memory controller to said CPU.

6. The memory controller according to claim 4, wherein said second circuit deactivates the second control signal and extends the bus cycle by a further one clock cycle when the address output from said memory controller to said memory is the address of the nonsequential cycle supplied from said CPU to said memory controller in the clock cycle in which read data from said memory corresponding to the address with the continuous value is output to said CPU.

7. The memory controller according to claim 4, wherein said first circuit comprises:

a circuit that selects an output of a circuit for generating the address having the value continuous with the address output to said memory in one clock cycle when the second control signal is inactive in a clock cycle immediately preceding said one clock cycle or when the first control signal indicates the sequential cycle in said one clock cycle, and otherwise selects the address provided by said CPU.

8. The memory controller according to claim 1, wherein said first circuit comprises:
   an adder that generates the address obtained by incrementing the input address by a predetermined value;
   a selector that receives an output of said adder and the address from said CPU and selects one of the output of said adder and the address from said CPU, for output; and
   a register that samples an output of said selector;
   an output of said register being supplied to said adder.

9. The memory controller according to claim 8, wherein said second circuit comprises:
   a first latch circuit that latches the second control signal being currently output from said second circuit;
   a first logic circuit that outputs a result of a predetermined logical operation between a signal constituting the first control signal and being activated at a time of the sequential cycle and an output signal of said first latch circuit;
   a second latch circuit that samples an output signal of said first logic circuit;
   a second logic circuit that outputs a result of a predetermined logical operation among an output signal of said second latch circuit, the second control signal being currently output from said second circuit, and a signal constituting the first control signal and being activated at a time of the nonsequential cycle; and
   a third latch circuit that latches an output signal of said second logic circuit.

10. The memory controller according to claim 9, wherein said first logic circuit comprises a logical OR circuit that receives the signal being activated at the time of the sequential cycle and an inverted signal of the output of said first latch circuit; and
   said second logic circuit comprises a NAND circuit that receives the output signal of said second latch circuit, the second control signal, and the signal being activated at the time of the nonsequential cycle.

11. The memory controller according to claim 10, wherein the output signal of said first logic circuit is set to a selection control signal for said selector.

12. A memory controller performing address and data transfer between a CPU and a memory, said memory controller receiving from said CPU a first control signal including at least information indicating whether a type of a bus cycle is a sequential cycle with an address thereof being continuous with an address of an immediately preceding bus cycle or a nonsequential cycle with address thereof being unrestricted by the address of the immediately preceding cycle, and outputting a second control signal for notifying completion of the bus cycle, said memory controller comprising:
   a circuit that generates in advance an address assuming the sequential cycle from a current address before a current bus cycle is completed and outputs to said memory the address assuming the sequential cycle in a clock cycle immediately following a clock cycle in which the address assuming the sequential cycle is generated; and
   a circuit that supplies to said CPU read data from said memory, corresponding to the address assuming the sequential cycle and deactivating the second control signal when read data at the address corresponding to the nonsequential cycle is to be supplied at a time of the output of the read data corresponding to the address assuming the sequential cycle to invalidate the read data output to said CPU.

* * * * *